(12) United States Patent
Zabih et al.

(10) Patent No.: US 6,181,817 B1
(45) Date of Patent: Jan. 30, 2001

(54) METHOD AND SYSTEM FOR COMPARING DATA OBJECTS USING JOINT HISTOGRAMS

(75) Inventors: Ramin D. Zabih, Ithaca, NY (US); Gregory S. Pass, Rockville, MD (US)

(73) Assignee: Cornell Research Foundation, Inc., Ithaca, NY (US)

( * ) Notice: Under 35 U.S.C. 154(b), the term of this patent shall be extended for 0 days.

(21) Appl. No.: 09/192,991

(22) Filed: Nov. 16, 1998

Related U.S. Application Data
(60) Provisional application No. 60/065,828, filed on Nov. 17, 1997.

(51) Int. Cl.$^7$ ............................................. G06K 9/54
(52) U.S. Cl. ........................ 382/170; 382/305; 707/104; 707/6
(58) Field of Search ..................................... 382/305, 168, 382/170, 165, 162; 358/522; 707/3, 6, 101, 104

(56) References Cited

U.S. PATENT DOCUMENTS

| | | | |
|---|---|---|---|
| 5,521,841 | 5/1996 | Arman et al. | 364/514 A |
| 5,546,475 | 8/1996 | Bolle et al. | 382/190 |
| 5,579,471 | 11/1996 | Barber et al. | 395/326 |
| 5,594,807 | * 1/1997 | Liu | 382/168 |
| 5,606,655 | 2/1997 | Arman et al. | 395/140 |
| 5,893,095 | * 4/1999 | Jain et al. | 707/6 |

OTHER PUBLICATIONS

Androutsos et al. "Directional detail histogram for content based image retrieval" 1997 13th International Confernce on Digital Signal Processing Proceedings, vol. 1, pp. 22–228, Jul. 1997.*

Androutsos et al. "Efficient image database filtering using colour vector techniques" IEEE 1997 Canadian Conference on Electrical and Computer Engineering, May 1997. Engineering Innovation: Voyage of Discovery, vol. 2, pp. 827–830.*

Virginia E. Ogle, Michael Stonebraker, Chabot: Retrieval from a Relational Database of Images, Theme Feature, Sep., 1995, pp. 40–48.

Myron Flickner et al., Query by Image and Video Content: The QBIC System, Theme Feature, Sep., 1995, pp. 23–32.

R.W. Picard, T.P. Minka, Vision texture for annotation, Multimedia Systems (1995) 3:3–14.

Jing Huang et al. Image Indexing Using Color Correlograms, 1997 IEEE, pp. 762–768. *[1]

Brian V. Funt and Graham D. Finlayson, Color Constant Color Indexing, 1995 IEEE Transactions on Pattern Analysis and Machine Intelligence, vol. 17, No. 5, May 1995.

Michael J. Swain, Color Indexing, International Journal of Computer Vision. 7:1, 11–32, 1991.

Greg Pass & Ramin Zabin, Histogram Refinement for Content-Based Image Retrieval, IEEE, Dec. 1996, pp. 96–102.**

* cited by examiner

*Primary Examiner*—Amelia Au
*Assistant Examiner*—Jingge Wu
(74) *Attorney, Agent, or Firm*—Perkins, Smith & Cohen, LLP; Jacob N. Erlich; Jerry Cohen

(57) ABSTRACT

A joint histogram is used for content-based data object comparison. For a data object which can be described by a plurality of features and values, a set of features describing the data object is selected. A joint histogram is a k-dimensional vector, such that each entry in the joint histogram contains the number of data points in the data object that are described by a k-tuple of feature values. The data object is analyzed according to the set of features and the results entered into the joint histogram. The joint histogram distinguishes the data object from other data objects. Joint histogram comparisons may be used to identify the similarity between two or more particular data objects.

28 Claims, 3 Drawing Sheets

METHOD AND SYSTEM FOR COMPARING DATA OBJECTS USING JOINT HISTOGRAMS

CROSS-REFERENCE TO RELATED APPLICATIONS

This application claims priority of U.S. provisional application Ser. No. 60/065,828 filed Nov. 17, 1997 and titled, "Histogram Refinement for Content-Based Image Retrieval" by the present inventors.

FIELD OF THE INVENTION

This invention relates generally to information management using histograms and more particularly to image management on a computer system using histograms.

BACKGROUND OF THE INVENTION

Many applications require methods for comparing data objects based on their content. Comparing images is useful, for example, in scene break detection, in parsing in video, and in image retrieval. One method of indexing images for later comparison is manual-tagging of images with human-selected keywords. This method, however, is neither flexible enough to satisfy the growing community of imagery users, nor fast enough to compete with the rate of information gathering. Fully automated content-based solutions are preferable.

Content-based image retrieval, in which a user presents an image and the retrieval system returns the most similar images, illustrates the demand for automatically comparing objects based on their content.

Most image retrieval systems operate in two distinct phases: an image summary phase, followed by a summary comparison phase. In the image summary phase, every image in the database is summarized as a vector, utilizing a particular method, such as color histogramming. The vectors are computed once and stored for later retrieval. In the summary comparison phase, a user presents a query image, and a comparison measure is used to compare the query image's summary with other image summaries and retrieve some number of the most similar vectors (images).

Color histogramming is the most widely used image summary method, employed in systems such as IBM's QBIC and Virage's VIR Engine. A color histogram is a vector where each entry stores the number of pixels of a given color in the image. All images are scaled to contain the same number of pixels before histogramming, and the colors of the image are mapped into a discrete colorspace containing n colors. Typically, images are represented in the RGB colorspace, using a few of the most significant bits per color channel to discretize the space.

Color histograms are widely used for content-based image retrieval because they are simple and quick to compute, and despite their simplicity, exhibit attractive properties. Color histograms are tolerant of movement of objects in the image and of changes in camera viewpoint, and are robust against occlusion. This invariance is due to the fact that color histograms do not relate spatial information with the pixels of a given color.

Color histograms have proven effective for small databases, e.g. 60–1140 images, but limitations become rapidly apparent with larger databases, e.g. tens of thousands of images. Because a color histogram records only color information, images with similar color histograms can have dramatically different appearances. For example, an image of a man in a red golf shirt may have a similar color histogram to an image of red flowers. In a large database, it is common for unrelated images to have similar color histograms.

There have been some attempts to improve color histograms by incorporating spatial information. Among the methods has been an attempt to capture the spatial arrangement of the different colors in the image. The image is partitioned into rectangular regions using maximum entropy, where each is region is predominantly a single color. Maximum entropy is the state at which all values in the distribution occur with equal probability. The similarity between two images is the degree of overlap between regions of the same color. While this method gives better results than color histograms without spatial information, it requires substantial computation, particularly in the partitioning algorithm. Additionally, the partitioning algorithm is affected by changes in orientation and position of the objects in the image.

Another histogramming method divides the image into five partially overlapping regions and computes the first three moments of the color distributions in each image. The moments of a distribution are the sums of the integer powers of the values. The mean of a distribution is derived from the first moment ($1^{st}$ power), the variance and standard deviation from second moment ($2^{nd}$ power), etc. The moments are computed for each color channel in the HSV colorspace, where pixels close to the border of the image have less weight. The distance between two regions is a weighted sum of the differences in each of the three moments. The distance between two images is the sum of the distance between the center regions, plus (for each of the four side regions) the minimum distance of that region to the corresponding region in the other image, when rotated by 0, 90, 180 or 270 degrees. Because the regions overlap, this method is insensitive to small rotations and translations.

Another histogramming method captures the spatial correlation between colors. This approach is called color correlograms, and is related to the correlogram technique from spatial data analysis. A color correlogram for a given pair of colors (i,j) and a distance k contains the probability that a pixel with color i will be k pixels away from a pixel of color j. To reduce the storage requirements, they concentrate on autocorrelograms, where i=j.

Another histogramming method uses color histograms to recognize individual objects contained in an image by comparing the histogram of a query object with the histograms of the images in the database. For the best matches, a histogram backprojection is performed to segment the objects from their backgrounds. The histogram comparison using this method can be upset by a pixel in the background in two ways: (1) the pixel has the same color as one of the colors in the query object. (2) the number of pixels of that color in the object is less than the number of pixels of that color in the query object.

In sum, it remains desirable to have an efficient image retrieval system which allows for significant differences in the appearance of similar images, such as: rotation and translation of objects in the image; addition, occlusion and subtraction of objects in the image; and changes in camera viewpoint and magnification. It is also important that the image summary phase be efficient in order to handle large imagery collections.

It is an object of the present invention to provide a method and apparatus to perform efficient data object comparisons based on data object content.

It is an object of the present invention to provide a method and apparatus to perform efficient image comparisons based on image content.

It is another object of the present invention to provide a method and apparatus to perform image retrieval which allows for significant differences in the appearance of images having similar content.

It is another object of the present invention to provide a method and apparatus to perform image object retrieval, in which similar objects within images may be identified allowing for significant differences in the appearance of images having similar content.

SUMMARY OF THE INVENTION

The problems of efficiently and accurately summarizing and comparing the content of data objects are solved by the present invention of comparing data objects using joint histograms.

The joint histogram, which is a multidimensional histogram, is created from a set of data object features. For example, in a joint histogram of a visual image, analyzed pixel by pixel, each entry in the joint histogram would contain the number of pixels in the image that are described by a particular combination of feature values. In a joint histogram that combines color information with intensity gradient, the joint histogram will contain $n_{color} \cdot n_{gradient}$ entries. Each pixel in the image has a color value and an intensity gradient value. The value stored in each entry in the joint histogram is the number of pixels in the image with a particular color value and a particular intensity gradient value.

Generally, given a set of k features, where the l'th feature has $n_1$ possible values, a joint histogram may be constructed. A joint histogram is a k-dimensional vector, such that each entry in the joint histogram contains the number of instances in a data object that are described by a k-tuple of feature values. The size of the joint histogram is $n = \pi_{l-1}^{k} n_l$, the number of possible combinations of the values of each feature. Just as a color histogram approximates the density of pixel color, a joint histogram approximates the joint density of several data object features. Joint histograms can be compared using the same methods as one dimensional vectors.

In image retrieval, joint histograms reduce the probability that distinct components of the content within an image and between images are considered to be the same. For example, a particularly-constructed joint histograms could reduce the probability that a pixel of a particular color in an object in an image will be incorrectly matched against a pixel of that same color in the background of the image. Different similarly-colored regions of the image will tend to have additional features which are distinct, and the joint histogram can summarize these differences. The choice of features to incorporate in the joint histogram will determine the range of transformations (scaling, zooming, etc.) that can be applied to the image without significantly changing the summary. The ability to separate similarly-colored components of content in an image is an advantage of joint histograms. Color histograms do not have this property. Replacing color histograms with joint histograms therefore improves the results of histogram-based image retrieval.

In general, joint histograms may be used to distinguish large numbers of data objects from each other, and identify those data objects which have similar content. Color is only one property from among many properties that may be used in a joint histogram. Similar data objects will tend to have similar joint histograms, and different data objects will tend to have distinct joint histograms. Thus the similarity between two data objects can be determined by comparing their joint histograms.

In addition, a subset of one particular data object may be compared with other data objects to identify the presence of that subset in another data object. In this case, only the joint histogram's entries which characterize the subset of the data object are used to compare two data objects. Subset comparison is therefore a natural complement of data object comparison.

In addition to the joint histogram itself, a technique called reduced intersection data provides that only a few entries, or a few pixels, per data object suffices to provide a recognizable cue for that object.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
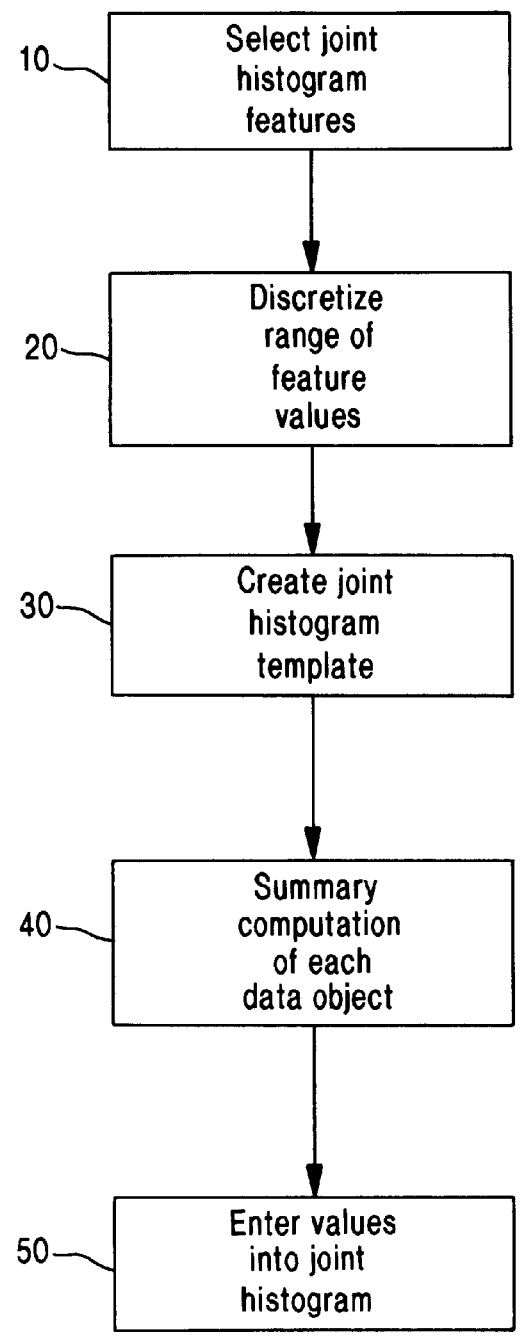
FIG. 1 is a flow chart of developing a joint histogram according to principles of the invention.

FIG. 1 is a flow chart of the method of developing a joint histogram for the summary of a data object. In a first embodiment of the invention, the retrieval of images from a database is used, but the present invention may be practiced in any domain which can be described by features.

Generally speaking, given a set of k features, where the l'th feature has $n_l$ possible values, a joint histogram may be constructed describing a data object. A joint histogram is a k-dimensional vector, such that each entry in the joint histogram contains the number of data points in the data object that are described by a k-tuple of feature values. The size of the joint histogram is therefore $n = \pi_{l-1}^{k} n_l$, the number of possible combinations of the values of each feature. Just as a color histogram approximates the density of pixel color, a joint histogram approximates the joint density of several data object features.

Referring now to FIG. 1, a joint histogram is constructed by first identifying and selecting features of the data object (or objects) at hand, block 10. In the first embodiment of the invention, the data object is an image having pixels, and a set of pixel features is selected. The features are selected according to the properties of data they describe as it affects the retrieval process. In image retrieval, it is optimal to select features and components of the image that do not change when certain transformations are applied to objects in the image. These transformations may include translation, rotation and scaling. Also, the selected features must describe the same components of the image in order to construct a successful joint histogram. For example, a single set of features must describe either single-pixel components or multiple-pixel components, but not both.

A number of features may be used to create the joint histogram for image retrieval. The following features are merely exemplary, and the present invention is not limited to these features.

A first feature which may be used in the joint histogram is color. In the present embodiment, the standard RGB colorspace is used, however, in alternative embodiments, other colorspaces may be used.

A second feature which may be used is edge density which is defined at pixel (j, k) to be the ratio of edges to pixels in a small neighborhood surrounding the pixel. The edge representation of the image may be computed with a standard method.

A third feature is texturedness which is defined at pixel (j, k) to be the number of neighboring pixels whose intensities differ by more than a fixed value.

A fourth feature is gradient magnitude which is a measure of how rapidly intensity is changing in the direction of greatest change. The gradient magnitude at a pixel (j, k) may be computed using standard methods.

A fifth feature is rank which is defined with respect to pixel (j, k) as being the number of pixels in the local neighborhood whose intensity is less than the intensity at (j, k).

An arbitrary feature can have a large (possibly infinite) range of possible values. To reduce the number of possible values to store in the joint histogram, the range is discretized, or partitioned, block 20. For example, the RGB colorspace, which has $256^3$ values, may be partitioned into 64 quantized colors. The range of values may be partitioned so that each discrete value appears with approximately equal likelihood. A substantially uniform discretization maximizes the information conveyed by a feature.

A feature may be discretized by approximating its cumulative distribution over a subset of data objects, and dividing the distribution into partitions with equal probability. The approximation is generated using a population of data objects. Each partition of the cumulative distribution is indicative of the range of continuous values which will be treated as a single discrete value.

After a set of features is selected and the range of possible values is determined, a joint histogram template is created, block 30, which has $n_{feature1} \times n_{feature2} \times n_{feature(n)}$ entries to receive the data analyzed from the data objects.

Next, a summary computation is performed on each data object, i.e. each data object is analyzed for the selected features, block 40. Summary computation need be performed only once for each object if the summaries are stored, for example, in a database.

Finally, the values of each feature of the analyzed object are entered in combination into a joint histogram which is stored for future comparison, block 50.

In the first embodiment of the invention, each entry in the joint histogram contains the number of pixels in the image that are described by a particular combination of feature values. For example, if the selected set of features is composed of color information and intensity gradient, the joint histogram would be as follows. A given pixel in the image has a color value (in a discretized range 0 ... $n_{color}-1$) and an intensity gradient value (in a discretized range 0 ... $n_{gradient}-1$). The joint histogram for color and intensity gradient will contain $n_{color} \cdot n_{gradient}$ entries. The value stored in each entry in the joint histogram is the number of pixels in the image with a particular color value and a particular intensity gradient value.

Figure 2:
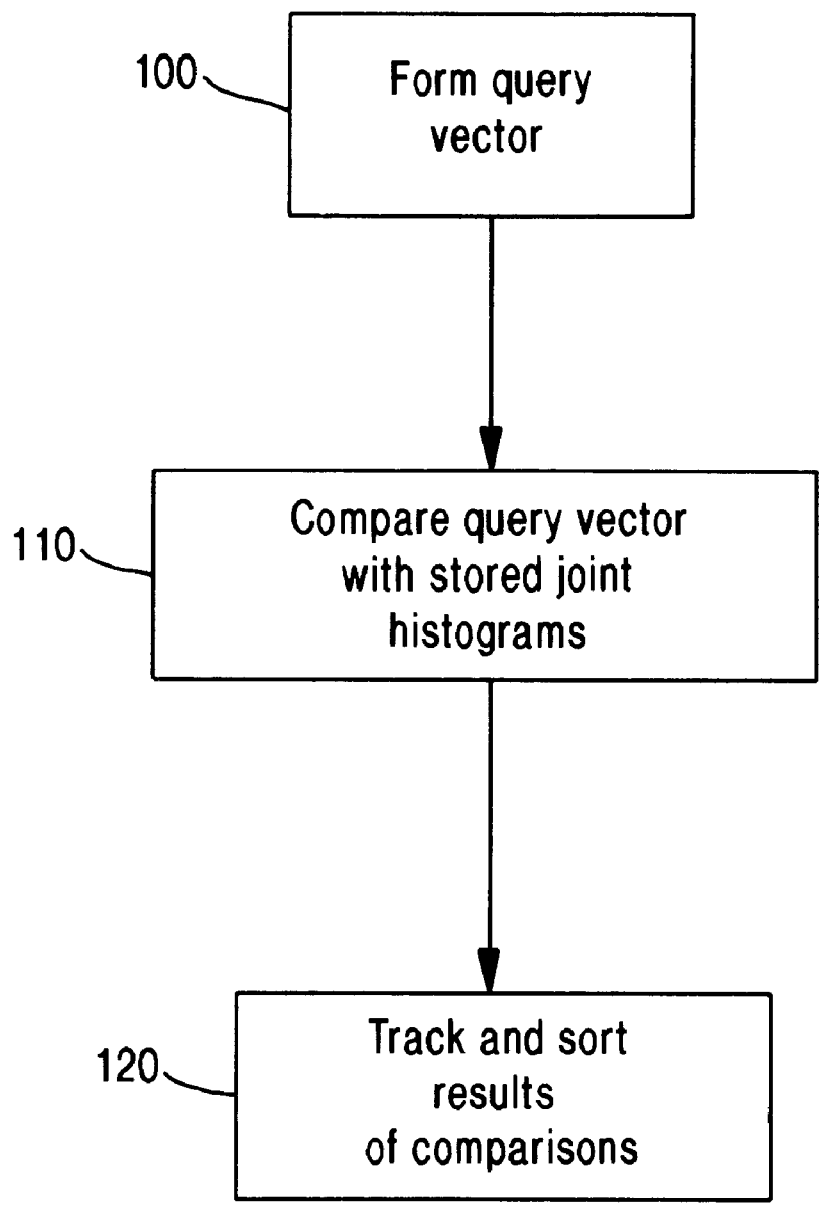
FIG. 2 is a flow chart of the data object retrieval process according to principles of the present invention; and, FIG. 3 is a block diagram of the data object retrieval system of FIG. 1 and FIG. 2 according to principles of the present invention.

FIG. 2 shows the data object comparison process according to principles of the present invention. First a query is developed, that is, a summary computation is performed on the data object to be matched, forming a query vector, block 100.

Next, the joint histogram of the data object to be matched is compared to other joint histograms, block 110. Joint histograms are vectors which may be compared using a variety of known methods of vector comparison. One such method is comparing using the $L_1$ distance, which is the sum of absolute differences between the vectors being compared. That is, given two vectors, for every entry in the vector, the values in the corresponding entries are subtracted, the absolute value of each difference is taken, and all the absolute values are added.

To retrieve an image, the results of all the vector comparisons are tracked and the results are sorted to find a vector (or vectors) closest to the query vector, block 120.

In order to make comparing multiple vectors more efficient, the joint histograms may be indexed according to an appropriate schema.

Also, to making comparing more efficient, a reduced intersection method may be used. In the reduced intersection method, only the c largest entries in each histogram are compared. Comparing only a small number of entries can produce results which closely approximate retrieval using all n entries in the histogram. Generally, the largest entries in a histogram capture the most distinctive features of the data object. Additionally, the smaller entries in the histogram are likely to be noise, i.e. inaccurate feature analyses. Hence, reducing the number of entries compared by eliminating the smaller entries can improve the comparison results. The time required for comparison of histograms without using the reduced intersection method is O(mn), where m is the number of vectors to be compared and n is the number of entries in the histogram. In reduced intersection, if the histogram entries have been sorted and stored prior to the comparison, the time required for comparison with a fixed scope is O(mc), where m is the number of vectors to be compared and c is the number of histogram entries used for comparing. For comparing many histograms, using the reduced intersection method is considerably faster when c<n.

Figure 3:
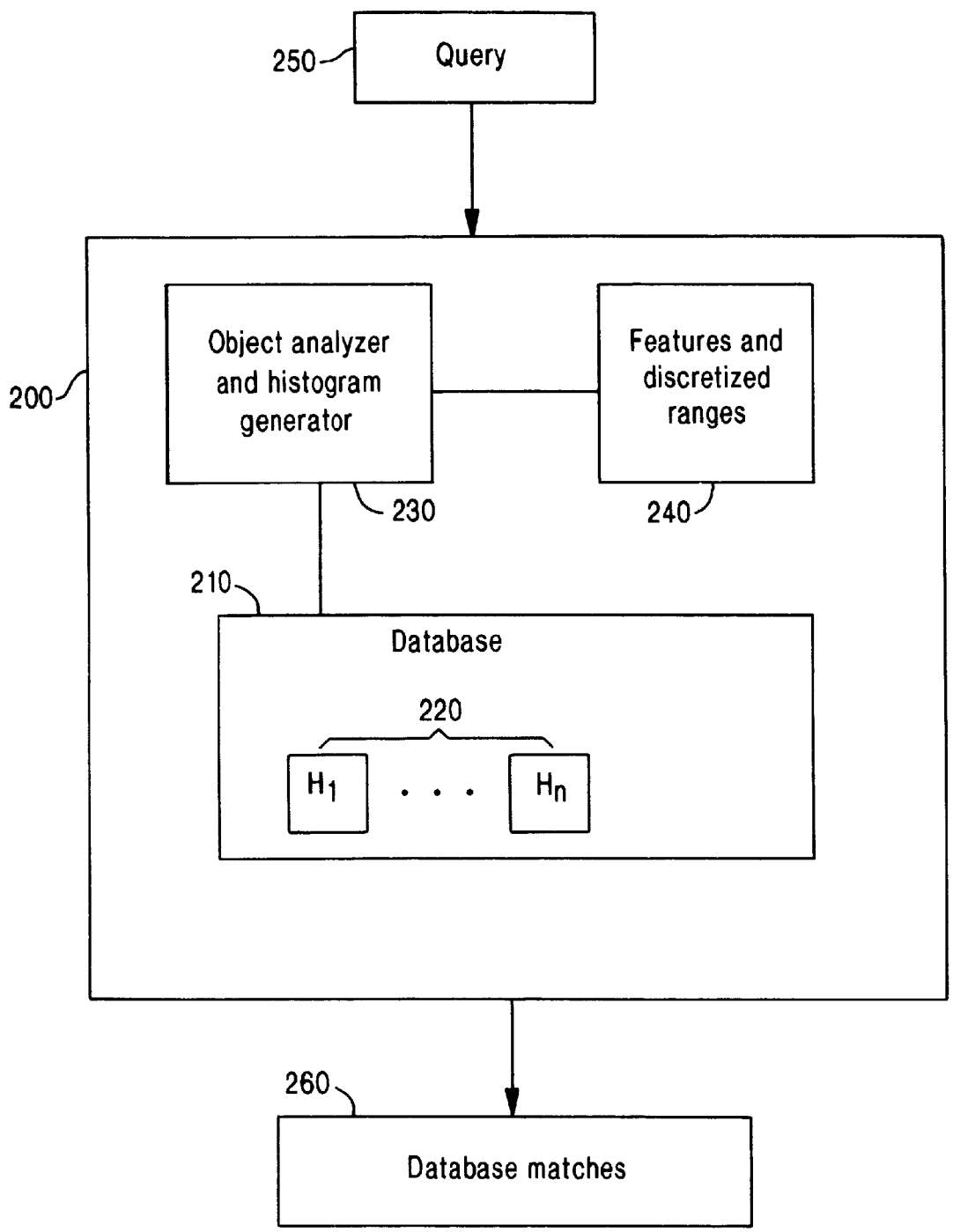

FIG. 3 shows a data object retrieval system 200 which executes the process described above. A database 210 stores a plurality of joint histograms 220 which were entered using the object analyzer 230. Each joint histogram in the plurality of joint histograms was analyzed according to the selected set of features and discretized value ranges 240. When a query 250 is input to the data object retrieval system 200, the object analyzer 230 forms a query vector and performs a comparison with the contents of the database. The system 200 then generations matches from the database to the query.

In image retrieval, joint histograms reduce the probability that distinct components of the content within an image and between images will be considered to be the same. For example, a particularly-constructed joint histogram could reduce the probability that a pixel of a particular color in an object in an image will be incorrectly matched against a pixel of that same color in the background of the image. Different similarly-colored regions of the image will tend to have additional features which are distinct, and the joint histogram can summarize these differences. The choice of features to incorporate in the joint histogram will determine the range of transformations (scaling, zooming, etc.) that can be applied to the image without signficantly changing the summary. The ability to separate similarly-colored components of content in an image is an advantage of joint histograms. Color histograms do not have this property. Replacing color histograms with joint histograms therefore improves the results of histogram-based image retrieval.

In general, joint histograms may be used to distinguish large numbers of data objects from each other, and identify those data objects which have similar content. Color is only property from among many properties that may be used in a joint histogram. Similar data objects will tend to have similar joint histograms, and different data objects will tend to have distinct joint histograms. Thus the similarity between two data objects can be determined by comparing their joint histograms.

In addition, a subset of one particular data object may be compared with other data objects to identify the presence of that subset in another data object. In this case, only the joint histogram's entries which characterize the subset of the data object are used to compare the two data objects. Subset comparison is therefore a natural complement of data object comparison.

While the size of a joint histogram is significantly larger than a color histogram, generally most of the entries in a joint histogram are zero so storage requirements are not, in fact, much greater for joint histograms than they are for color histograms. Standard compression schemes, such as run-length encoding, can be applied to good effect. In addition, dimensionality-reducing techniques, such as Principle Component Analysis (PCA), naturally offer an improved representation of the joint histogram.

Also, while the number of entries in a joint histogram increases substantially with additional features, the actual number of nonzero entries that must be stored does not increase at that same rate and remains practical compared to color histograms.

Because both color histograms and joint histograms use the same measures for comparison, the efficiency of comparison is the same for both methods. The speed of comparison is determined by the number of histogram entries to be compared.

While an image retrieval process was used to describe an embodiment of the present invention, the invention may be used with any type of data object which may be described using features. Other applications include music data, representations of molecules, and astronomical charts.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A computer-implemented method for comparing data objects where those data objects may be described by features, comprising the steps of:

selecting a set of features describing a data object, each feature having a range of values;

creating a joint histogram template based on the set of features, the joint histogram template having entries for combinations of features and values;

analyzing the data object according to the set of features to obtain joint histogram values; and, entering the joint histogram values into the joint histogram template to create a joint histogram describing the data object, whereby the data object is identifiable by the joint histogram from other data objects.

2. The method of claim 1 wherein said selecting step further comprises selecting features according to requirements of a selected data comparison process.

3. The method of claim 1 further comprising the step of:

discretizing the range of feature values to reduce the number of value entries to be made in the joint histogram.

4. The method of claim 3 wherein each range is discretized such that each discrete value occurs with approximately equal likelihood over a representative set of data objects.

5. The method of claim 1 further comprising the step of:

storing the joint histogram in a database.

6. The method of claim 5 further comprising the step of:

indexing the database.

7. The method of claim 1 further comprising the steps of:

determining a query vector of a query object;

comparing the query vector with the joint histogram of the data object to determine a similarity between the data object and the query object.

8. The method of claim 7 further comprising tracking results of the comparing step to produce a plurality of joint histograms matching the query vector.

9. The method of claim 7 wherein the comparing step uses a reduced intersection of histogram entries for vector comparison.

10. A computer-implemented method for comparing images where those images may be described by features, comprising the steps of:

selecting a set of features describing an image, each feature having a range of values;

creating a joint histogram template based on the set of features, the joint histogram template having entries for combinations of features and value;

analyzing the image according to the set of features to obtain joint histogram values; and, entering the obtained joint histogram values into the joint histogram template to create a joint histogram describing the image, whereby the image is identifiable by the joint histogram from other images.

11. The method of claim 10 wherein the selecting step further comprises selecting features which remain constant when transformations are applied to objects in the image.

12. The method of claim 10 further comprising the step of:

discretizing the range of feature values to reduce the number of value entries to be made in the joint histogram.

13. The method of claim 12 wherein each range of values is discretized such that each discrete value occurs with approximately equal likelihood over a representative set of images.

14. The method of claim 10 further comprising the step of:

storing the joint histogram in an indexed database.

15. The method of claim 10 further comprising the steps of:

determining a query vector of a query image;

comparing the query vector with the joint histogram of the image to determine the similarity between the image and the query image.

16. The method of claim 15 further comprising the step of:

tracking results of the comparing step to produce a plurality of joint histograms matching the query vector.

17. The method of claim 15 wherein the comparing step uses a reduced intersection of histogram entries for vector comparison.

18. A computer-implemented method of image retrieval from a database, comprising the steps of:

selecting a set of features describing an image;

creating a joint histogram template based on the set of features, the joint histogram template having entries for combinations of features and values;

analyzing the image according to the set of features to obtain histogram values;

entering the obtained histogram values into the joint histogram template to create a joint histogram describing the image; and storing the joint histogram in the database, whereby the image is identifiable by the joint histogram from other images in the database.

19. The method of claim 18 wherein the selecting step further comprises selecting features which remain constant when transformations are applied to objects in the image.

20. The method of claim 18 further comprising the step of:

discretizing the range of feature values to reduce the number of value entries to be made in the joint histogram.

21. The method of claim 20 wherein each range of values is discretized such that each discrete value occurs with approximately equal likelihood over a representative set of data objects.

22. The method of claim 18 further comprising the step of:

indexing the database.

23. The method of claim 18 further comprising the steps of:

determining a query vector based on an image to be retrieved from the database;

comparing the query vector with histograms stored in the database to find a histogram matching the query vector.

24. The method of claim 23 further comprising the step of:

tracking results of the comparing step to produce a plurality of joint histograms matching the query vector.

25. The method of claim 23 wherein the comparing step uses a reduced intersection of histogram entries for vector comparison.

26. A system for data object retrieval from a database, comprising:

means for selecting a set of features describing a data object;

means for creating a joint histogram template based on the set of features, the joint histogram template having entries for combinations of features and values;

an object analyzer for analyzing the data object according to the selected set of features, the object analyzer producing histogram values, the object analyzer creating a joint histogram describing the data object by entering the values into the joint histogram template; and, means for storing the joint histogram in the database.

27. The system of claim 26 further comprising:

a means for indexing the database.

28. The system of claim 26 further comprising:

means for determining a query vector to retrieve the data object from the database; and means for comparing the query vector with histograms stored in the database to find the histogram matching the query vector.

* * * * *